Nov. 28, 1939.   E. E. FESSENDEN, JR   2,181,318
MACHINE DRIVING AND STOPPING MECHANISM
Filed Sept. 13, 1938

WITNESS
H. Woodard

Inventor
E. E. Fessenden, Jr.
By H. Q. Willson & Co.
Attorneys

Patented Nov. 28, 1939

2,181,318

UNITED STATES PATENT OFFICE 2,181,318

MACHINE DRIVING AND STOPPING MECHANISM

Edward E. Fessenden, Jr., Kingston, N. Y.

Application September 13, 1938, Serial No. 229,751

5 Claims. (Cl. 192—4)

The invention relates to a novel frictional mechanism for driving and stopping various kinds of machines, and it is intended primarily for use in operating sewing machines, particularly those used in garment factories and the like.

One object of the invention is to provide a simple and inexpensive mechanism which may be quickly and easily installed with little expense, will be well adapted for quick starting and stopping of the machine which it drives, and will eliminate all belts.

Another object is to provide one of the friction wheels with a tire of rubbered fabric or other friction material which receives the principal wear when both driving and braking the machine, whereby substitution of a new tire without replacing other parts, will rejuvenate the mechanism when the driving and braking functions have become impaired by wear.

A still further aim is to provide a novel mechanism which may be so associated with a work table that any of various sewing machines for performing different operations, may be easily placed in operative relation with said mechanism to be driven thereby.

With the foregoing and minor objects in view, the invention resides in the novel subject matter hereinafter described and claimed, description being accomplished by reference to the accompanying drawing.

Figure 1:
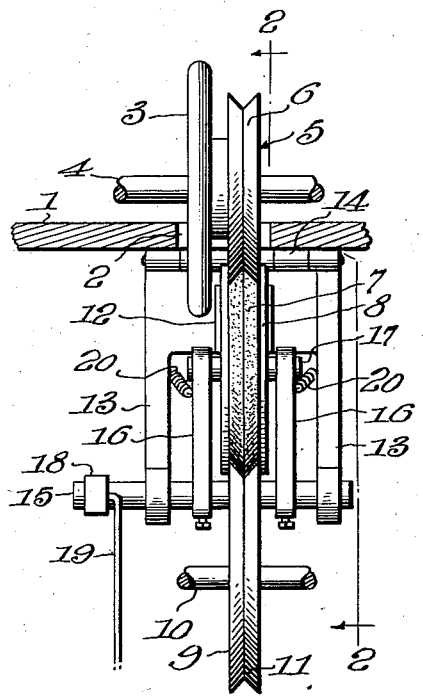
Fig. 1 is an elevation partly in section as indicated by line 1—1 of Fig. 2.
Figure 2:
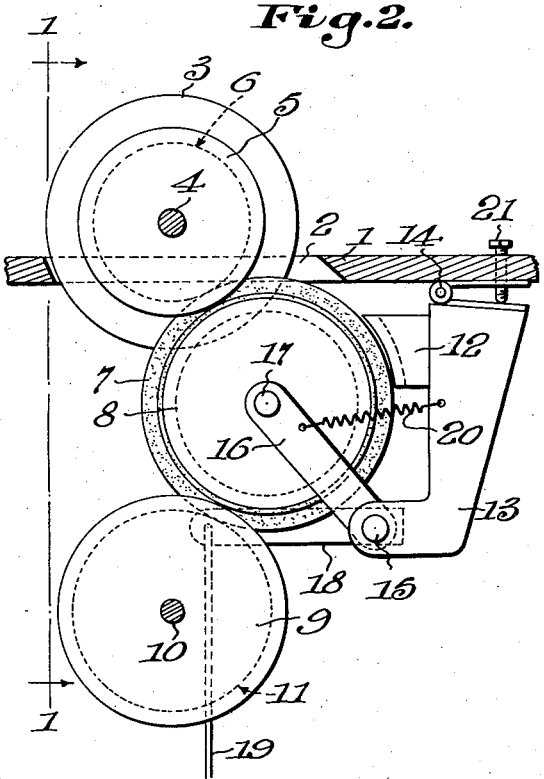
Fig. 2 is an elevation partly in section as indicated by line 2—2 of Fig. 1, the three driving wheels being shown in contact with each other.
Figure 3:
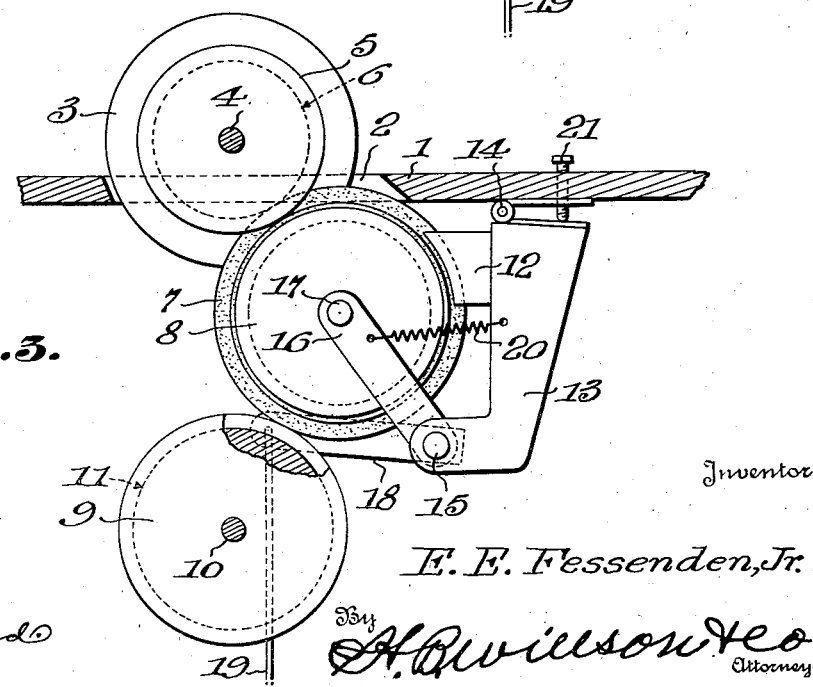
Fig. 3 is a view similar to Fig. 2 but showing the intermediate or transmitting wheel out of contact with the driving wheel and in contact with the fixed brake.

A preferred construction has been illustrated for illustrative purposes and while this construction will be specifically described, it is to be understood that within the scope of the invention as claimed, variations may be made.

The invention is shown in connection with a work table 1 having an opening 2 through which the usual hand wheel 3 of a sewing machine passes, said hand wheel being secured to the drive shaft 4 in the base of the machine. Secured on the shaft 4 in any appropriate manner, is a driven wheel 5 having a V-groove 6 in its periphery. Contacting with the wheel 5 is the tire 7 of a transmitting wheel 8, said tire being removably secured to said wheel 8, for instance by shellacing it in a peripheral groove of said wheel. The tread of the tire 7 is, of course, shaped for snug reception in the groove 6 of the wheel 5. The wheel 8 is principally below the work table 1, and still further below said table, is a driving wheel 9 mounted upon an appropriate driving shaft 10, said wheel 9 having a V-groove 11 in its periphery to snugly receive the tire 7 of the transmitting wheel 8, when power is to be transmitted to the shaft 4 from the shaft 10. The wheel 8, however, is mounted in such manner that it may be moved out of contact with the wheel 9 while remaining in contact with the wheel 5, and a fixed brake shoe 12 is provided to contact with the tire 7 of said wheel 8 when the latter is moved out of contact with the wheel 9. Thus the drive between the shafts 10 and 4 may be severed and a brake immediaely applied to stop said shaft 4.

By providing the tire 7 on the wheel 8, the other wheels 5 and 9 need be provided with no special friction treads or the like, and said tire 7 will receive practically all of the driving and braking wear. Thus, when the driving and braking functions of the machine have been impaired by wear, the mechanism may be rejuvenated simply by applying a new tire to the wheel 8, without seriously disturbing other parts and with no other part renewals.

When the invention is associated with a sewing machine, a suitable foot pedal of conventional form is utilized to move the wheel 8 into and out of contact with the driving wheel 9, and to move said wheel 8 against the brake shoe 12. In order that the pedal may function in this manner and in order that some adjustment may be made to compensate for wear, I provide the novel construction now to be described.

A suitable bracket 13 is hinged at 14 to the lower side of the work table 1 and projects downwardly therefrom at or near one edge of the wheel 8, the axis of the hinge 14 being parallel with the axes of the three wheels 5, 8 and 9. The lower end of the bracket 13 supports a rock shaft 15 upon which two arms 16 are suitably secured, the shaft 17 of the transmitting wheel 8 being carried by these arms. The shaft 15 is parallel with the axes of the wheels 5, 8 and 9 and the arms 16 are movable in such directions that said wheel 8 may move out of contact with said wheel 9 and remain at all times in contact with said wheel 5. The yieldability of the tire 7 permits it to remain in contact with the wheel 5 even though the arms 16 move the wheel 8 on an arc which is not concentric with said wheel 5. Moreover, the movement of the arms 16 may be very slight. An operating arm 18 is secured to the shaft 15 and projects horizontally therefrom, and a rod 19 is connected with and extends downwardly from said arm 18, to the foot pedal (not shown).

Movement of the pedal in one direction holds the tire 7 of the wheel 8 in contact with the wheel 9 and movement of said pedal in the other direction frees said tire 7 from said wheel 9 and moves said tire into contact with the brake 12. This brake may well be carried by the bracket 13, and I have shown coiled springs 20 so connected with said bracket and with the arms 16 as to urge the wheel 8 out of contact with the wheel 9. However, for this purpose, any other suitable provision could of course be made.

In the present disclosure, I have illustrated a set screw 21 threaded downwardly through the work table 1 and at its lower end abutting the lower leaf of the hinge 14. By tightening this screw, the bracket 13 may be swung in such direction as to force the wheel 8 toward the wheel 5, compensating for quite an amount of wear on the part of the tire 7, before requiring that a new tire be substituted. In place of the set screw 21, other appropriate adjusting means could of course be provided.

From the foregoing taken in connection with the accompanying drawing, it will be seen that novel and advantageous provision has been made for carrying out the objects of the invention, and while details have been shown which may at present be preferred, it is to be understood that the disclosure is illustrative rather than limiting.

I claim:

1. In a machine driving and stopping mechanism, a driving wheel, a transmitting wheel having a tire of yieldable friction material for contact with said driving wheel, a driven wheel contacting with said tire and adapted for connection with a machine to be driven, means mounting said driving and driven wheels in fixed spaced relation with each other, means mounting said transmitting wheel for movement from a driving position in which its yieldable tire contacts with both said driving and said driven wheels, to a drive severing position in which said yieldable tire remains in contact with said driven wheel but is free of contact with said driving wheel, and a relatively fixed brake with which said tire contacts when said transmitting wheel is moved to said drive severing position, whereby said tire provides a frictional driving connection between the driving and driven wheels and a frictional braking surface for coaction with said brake, and renewal of said tire without renewal of other parts will rejuvenate the mechanism when the driving and braking functions become impaired by wear.

2. In a machine driving and stopping mechanism, a driving wheel, a transmitting wheel for peripheral contact with the periphery of said driving wheel, a driven wheel for peripheral contact with said transmitting wheel, one of the two last named wheels being provided with a yieldable tire contacting yieldably with the periphery of the other of these two wheels, an arm carrying said transmitting wheel, a bracket on which said arm is so pivoted as to move said transmitting wheel into and out of contact with said driving wheel without disturbing the contact between said transmitting wheel and said driven wheel, means for swinging said arm to move said transmitting wheel into and out of contact with said driving wheel, mounting means for said bracket including means for so adjusting said bracket as to intensify the contact of said transmitting wheel with said driven wheel to compensate for wear, and a fixed brake shoe carried by said bracket in position for contact with the periphery of said transmitting wheel when the latter is moved out of contact with said driving wheel.

3. In a machine driving mechanism, a driving wheel, a transmitting wheel for peripheral contact with the periphery of said driving wheel, a driven wheel for peripheral contact with said transmitting wheel, one of the two last named wheels being provided with a yieldable tire yieldably contacting with the periphery of the other of these two wheels, an arm carrying said transmitting wheel, a bracket on which said arm is so pivoted as to move said transmitting wheel into and out of contact with said driving wheel without disturbing the contact of said transmitting wheel and said driven wheel, means for swinging said arm to move said transmitting wheel into and out of contact with said driving wheel, and mounting means for said bracket including means for so adjusting said bracket as to intensify the contact of said transmitting wheel with said driven wheel to compensate for wear.

4. In a machine driving and stopping mechanism, a driving wheel, a transmitting wheel for peripheral contact with the periphery of said driving wheel, a driven wheel for peripheral coaction with said transmitting wheel, means mounting said transmitting wheel for movement to a drive-severing position in which it is free of contact with said driving wheel but remains in contact with said driven wheel, and a relatively fixed brake with which said transmitting wheel contacts when moved to said drive-severing position.

5. In a machine driving and stopping mechanism, a driving wheel, a driven wheel spaced therefrom, a transmitting wheel contacting with said driving and driven wheels, means for moving said transmitting wheel from contact with said driving wheel and for continuously holding said transmitting wheel in contact with said driven wheel, and a fixed brake with which said transmitting wheel contacts when moved from contact with said driving wheel.

EDWARD E. FESSENDEN, Jr.